United States Patent [19]

Aondetto

[11] 4,350,317
[45] Sep. 21, 1982

[54] DEVICE FOR THE RESILIENT SUSPENSION OF A VEHICLE SEAT WITH LONGITUDINAL ADJUSTMENT

[75] Inventor: Bernard Aondetto, Nogent sur Marne, France

[73] Assignee: Sable Freres International, Pantin, France

[21] Appl. No.: 151,615

[22] Filed: May 20, 1980

[30] Foreign Application Priority Data

Jun. 28, 1979 [FR] France ............................. 79 16704

[51] Int. Cl.³ .......................................... F16M 13/00
[52] U.S. Cl. .................................. 248/588; 248/430; 248/562
[58] Field of Search ................. 248/588, 430, 562

[56] References Cited

U.S. PATENT DOCUMENTS 2,784,764 3/1957 Rigby et al. ................... 248/430 X
3,075,736 1/1963 Freedman ...................... 248/430 X
3,501,121 3/1970 Lautenbach ...................... 248/430
4,227,670 10/1980 Vander Burgh et al. ...... 248/430 X

FOREIGN PATENT DOCUMENTS 1729966 8/1971 Fed. Rep. of Germany .
2307917 8/1973 Fed. Rep. of Germany .
2546883 4/1977 Fed. Rep. of Germany .
2208353 6/1974 France .

*Primary Examiner*—Dave W. Arola
*Attorney, Agent, or Firm*—Berger & Palmer

[57] ABSTRACT

The top frame of a vehicle seat is fitted with upper longitudinal guides for slidably mounting the frame on an articulated system which serves to displace the seat in a vertical direction while also permitting horizontal displacement of the seat in sliding motion. The upper guides are locked in any desired longitudinal position by means of catches and may be disengaged by means of a release control member.

4 Claims, 4 Drawing Figures

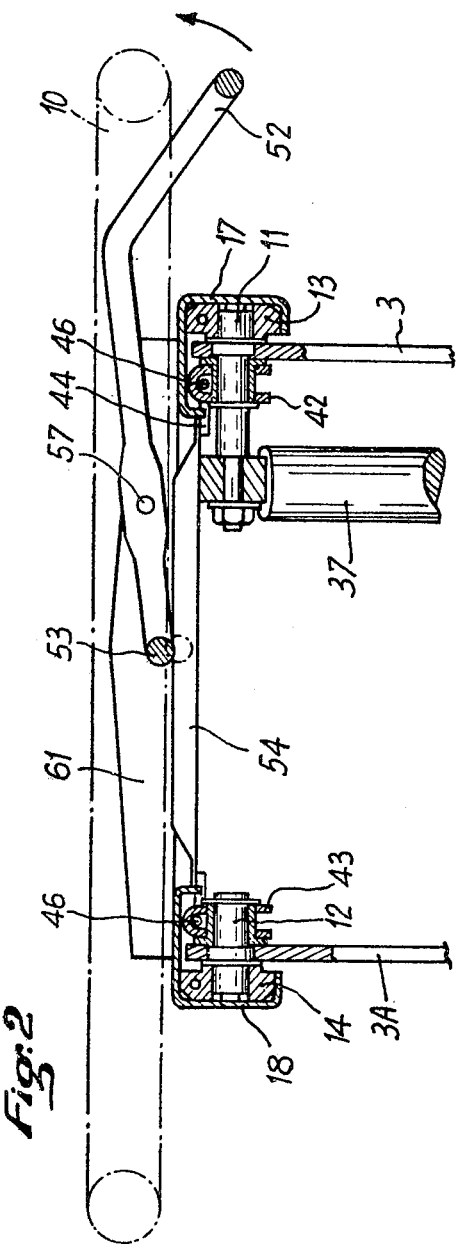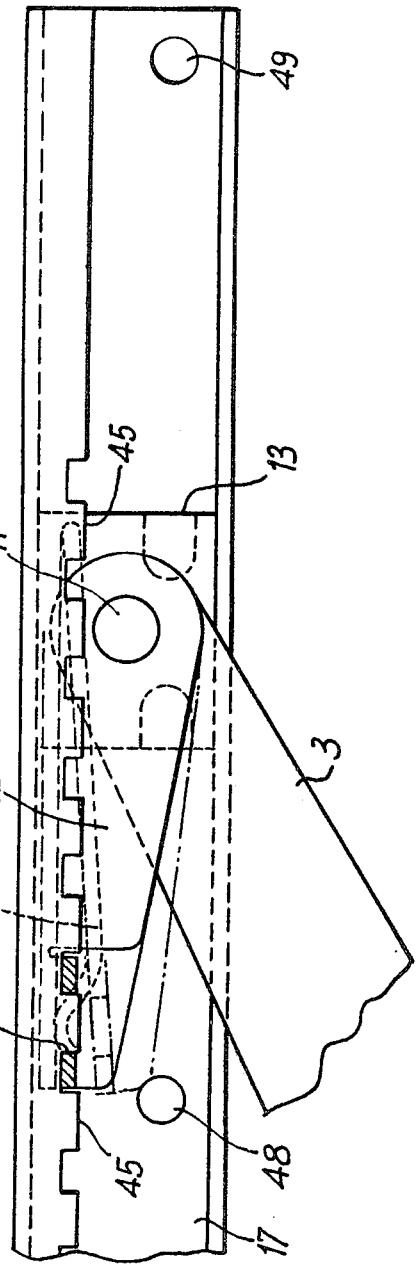

DEVICE FOR THE RESILIENT SUSPENSION OF A VEHICLE SEAT WITH LONGITUDINAL ADJUSTMENT

This invention relates to devices for the resilient suspension of vehicle seats and more particularly to means which permit longitudinal adjustment of the seat.

In a general manner, a device for resilient suspension of vehicle seats always comprises a bottom frame to be mounted on the vehicle, a top frame on which the seat is to be mounted, means for guiding the vertical displacements of the top frame with respect to the bottom frame, and resilient means applied against the bottom frame and attached to the top frame in order to urge this latter in the upward direction. The majority of these devices are also provided with means for adjusting the flexibility of the resilient means according to the weight of the user as well as height-adjustment means for ensuring vertical location of the useful travel of the suspension but devices of this type are not provided with any incorporated means for longitudinal adjustment of the seat. However, such a possibility is necessary in practice and is now imposed by prevailing standards.

In order to achieve this result, manufacturers have been led to devise guide systems for suspension devices which are manufactured in large-scale production by specialists, the guide systems being added to suspension devices either between the bottom frame and the floor of the vehicle, or between the seat and the top frame. A system of this type consists of a set of two pairs of guides formed by two shaped structural members usually of stamped sheet metal and capable of sliding one within the other either by direct contact of the two structural members or by means of shoes of plastic material, or else by means of rolling elements such as ball or roller bearings.

It is readily apparent that the fact of being obliged to adapt longitudinal seat-adjustment guides of this type to an existing suspension device constitutes a complication which imposes a heavy cost penalty on the complete assembly from a production standpoint while at the same time increasing its overall weight, not to mention the special study required in order to adapt the guides either to the bottom frame or to the top frame of the suspension device which is to be employed.

The aim of the invention is precisely to overcome this disadvantage by producing a seat suspension device having an incorporated longitudinal adjustment system which in any case calls for only a very small number of additional components and removes any need for future adaptation of additional longitudinal seat-adjustment guides in order to use the device in a vehicle.

To this end and in accordance with the invention, the top frame is fitted with upper longitudinal guides for supporting and slidably mounting said top frame on the top portion of vertical guiding means. The device further comprises means for locking said upper longitudinal guides in any desired position on said vertical guiding means, and means for controlling the release of said locking means.

An assembly of this type therefore inherently possesses all the desirable possibilities of adjustment, that is, not only adjustments of flexibility and height of the suspension but also longitudinal adjustment of the seat. There is therefore no need for any preliminary study or additional fitting prior to mounting the assembly on a vehicle, thereby directly obtaining a seat suspension which fully complies with standard specifications.

The novel system thus proposed is particularly advantageous when the means for vertical guiding of the top frame consist of scissors-type levers since the guides which already exist at the upper portion of said frame can serve at the same time as guides for the longitudinal adjustment of the seat, with the result that an assembly of lighter weight can thus be provided as will be more readily understood hereinafter.

These and other features of the invention will be more apparent upon consideration of the following description and attached drawings which show by way of example one embodiment of a device for the resilient suspension of vehicle seats, a system for longitudinal seat adjustment in accordance with the invention being incorporated in said device.

In the accompanying drawings:

FIG. 2 is a vertical part-sectional view taken along line II—II of FIG. 1;

FIG. 4 is a view to a larger scale showing the locking catch which is visible in FIG. 1.

Figure 1:
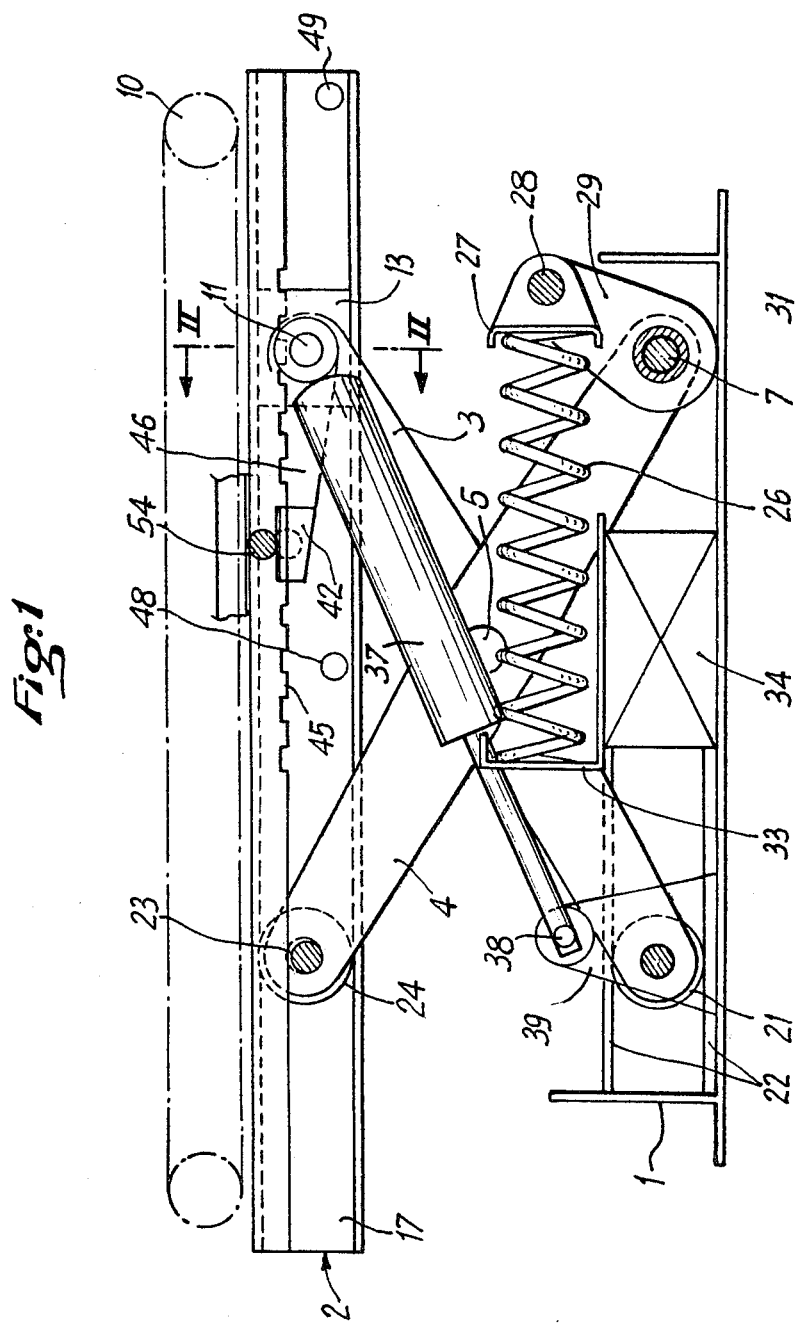
FIG. 1 is a longitudinal vertical sectional view of the deivce, this view being taken along line I—I of FIG. 3.
Figure 3:
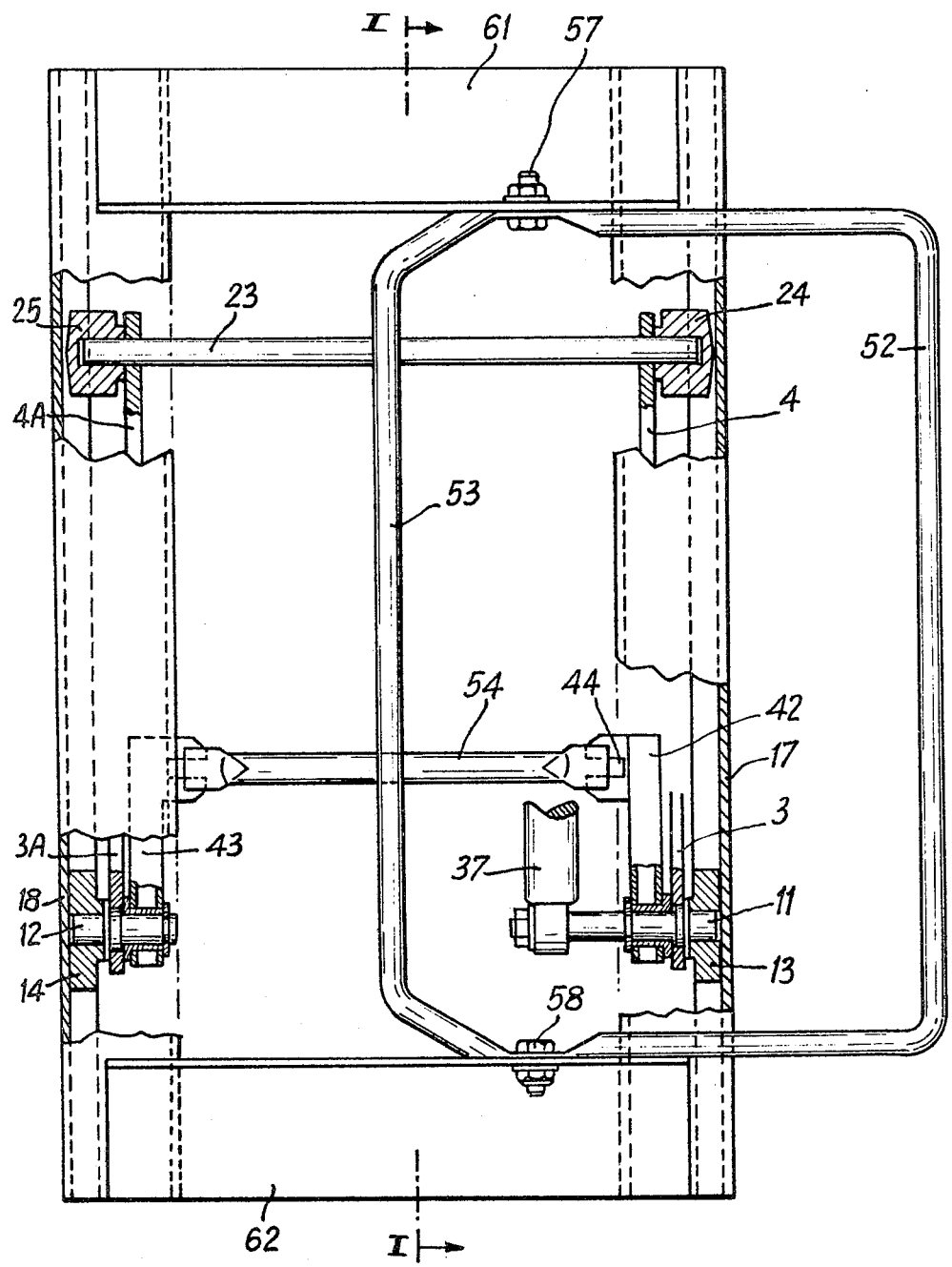
FIG. 3 is a plan view corresponding to FIG. 2 with portions broken away.

The device for the resilient suspension of vehicle seats with incorporated longitudinal adjustment as illustrated in FIGS. 1 to 3 essentially comprises a bottom frame 1 to be mounted on a vehicle, a top frame 2 which is intended to receive the seat (only the seat base 10 having been shown in the drawings) and means for guiding the vertical displacements of the top frame with respect to the bottom frame. In the example shown, said guiding means are constituted by two pairs of scissors-type levers 3, 4 and 3A, 4A which are all of the same length and are pivotally attached at their mid-points by means of two coaxial pivots such as the pivot 5. The lower ends of the levers 4, 4A are pivotally mounted on a horizontal cross-pin 7 carried by the bottom frame. The upper ends of the other two levers 3, 3A are pivotally mounted on two horizontal cross-pins 11, 12 supported respectively by two bearings 13, 14 constituted by two blocks of plastic material which are capable of sliding respectively in two shaped upper guides 17, 18. Said guides form part of the top frame 2 and have cross-sections in the shape of a "U" laid flat on one side and having unequal flanges in oppositely-facing relation as shown in particular in FIG. 2. The lower ends of the two levers 3, 3A are adapted to carry rollers such as 21 which run respectively in two horizontal longitudinal guides such as the guide 22 which also have cross-sections in the shape of a "U" laid flat and in oppositely-facing relation. Similarly, the upper ends of the two levers 4, 4A are adapted to carry rollers 24, 25 which are mounted on a pivot-pin 23 and run respectively within the two upper guides 17, 18.

The top frame is continuously urged in the upward direction by a compression spring 26, one end of which is applied against a cup 27, said cup being pivotally mounted on the crank-pin 28 of a crank-arm 29 which is fixed on a tube fitted over the cross-pin 7 and the two ends of which are welded respectively to the lower ends of the levers 4, 4A. The other end of the spring 26 is applied against a support bracket 33 forming part of a mechanism which is generally designated by the reference 34 but is not illustrated in detail. By way of example, said mechanism is of the type described in the French patent Application also filed by the present Applicant on Feb. 2, 1979 under No. 79 02 715 and entitled "A device for the resilient suspension of vehicle seats". The mechanism 34 is mounted on the bottom frame 1.

A shock-absorber 37 is attached by means of its upper end to the pivot-pin 11 and by means of its lower end to a pivot-pin 38 mounted in a support bracket 39 which is fixed on the bottom frame 1.

It will already be understood that, irrespective of the vertical position of the scissors-lever suspension device, the top frame 2 can be slidably displaced by means of its guides 17, 18 on the rollers 24, 25 and on the bearings 13, 14 in the longitudinal direction. In other words, the seat can be moved at will either forwards or backwards. As will readily be apparent, arrangements must also be made for securing the seat in any longitudinal position desired. To this end, the device is preferably provided on each side with a locking catch such as the catch 42 or 43, said catches being symmetrical with respect to the longitudinal vertical mid-plane of the complete assembly. The catch 42, for example, (see also FIG. 4), is pivotally mounted on the pin 11 and the end portion of the catch is provided with a recess 44 which is capable of selectively engaging in any one of the teeth 45 of a rack cut in the edge of the top flange of the upper guide 17, under the action of a catch-restoring spring 46. The structure and arrangement of the other catch 43 are identical with those of the catch 42. Two stops 48, 49 fixed against the web of the upper guide 17 limit the range of travel of the bearing 13 to the appropriate value. Advantageously, two similar stops can also be arranged on the other upper guide 18.

The catches 42, 43 can be released from the teeth of the racks simultaneously by lifting a handle 52 which is rigidly fixed to the bent-back end extensions of a longitudinal rod 53. Said rod rests on a cross-member 54, the two ends of which are rigidly fixed respectively to the ends of the two catches 42, 43. The two elbowed extensions of the longitudinal rod 53 are pivotally mounted on two pins 57, 58 and these latter are in turn mounted respectively on the vertical flanges of two L-section members or angle-irons 61, 62. The horizontal flanges of said angle-iron members are fixed in a flat position on the top faces of the two guides 17, 18 which are braced by said members. The unlocking device is thus capable of operating in any longitudinal position of the top frame 2 since the longitudinal rod 53 is always located above the cross-member 54 and produces action on this latter.

By way of alternative, the handle 52 could be attached directly to the cross-member 54 and extend either in the forward or rearward direction or even on each side, in which case it would occupy a variable position with respect to the seat, that is to say with respect to the base 10.

The operation of the device for longitudinal adjustment of the seat is self-explanatory. Irrespective of the characteristics and positions of the elements of the resilient system for suspension and vertical guiding of the vehicle seat, it is always possible by lifting the handle 52 to disengage the locking catches 42, 43 from the teeth of the two racks with which said catches cooperate and to displace the seat horizontally either forwards or backwards to the desired extent in a sliding movement of the upper guides on the rollers 24, 25 and on the bearings 13, 14, then to lock the seat in position by releasing the handle 52 so as to permit re-engagement of the recesses of the catches 42, 43 on the rack teeth. This longitudinal adjustment of the seat does not affect the characteristics of the suspension in any way. It should also be noted that the shock-absorber 37 is connected only to the bottom frame 1 and the vertical seat-guiding device, with the result that its damping characteristics also remain unmodified by any change in the longitudinal position of the seat. This is not the case in many conventional systems in which both ends of the shock-absorbers are attached respectively to the stationary bottom frame and to the top frame which is rigidly fixed to the vehicle seat.

As will be readily understood, the invention is not limited to the embodiment which has been described with reference to the accompanying drawings solely by way of example. Depending on the applications which may be contemplated, many modifications can accordingly be made without thereby departing either from the scope or the spirit of the invention.

Thus it follows, for example, that the principle of the invention is applicable to devices for the resilient suspension of vehicle seats in which the vertical seat-guiding means are not constituted by articulated scissors-type levers as in the embodiment hereinabove described but by other means such as articulated parallelograms or piston systems, for example.

What is claimed is:

1. A device for the resilient suspension of a vehicle seat, comprising: a bottom frame to be mounted on the vehicle,
   longitudinal guides in said bottom frame,
   a top frame on which the seat is to be mounted,
   longitudinal guides in said top frame,
   vertical guiding means for guiding the vertical displacement of said top frame with respect to said bottom frame,
   resilient means applied against said bottom frame and operatively connected to said top frame in order to urge said top frame in an upward direction,
   a bearing slidably mounted within each of said top frame longitudinal guides,
   said vertical guiding means comprising scissors-type levers pivotally connected at one end respectively to said bottom frame and to said bearings, a pivot pin for the pivotal connection of said scissors-type levers to said bearings, the ends of said levers being caused to slide within said bottom frame longitudinal guides and within said top frame longitudinal guides,
   locking means interposed between at least one of said bearings and the longitudinal guide of the top frame in which said bearing is slidably mounted for locking said top frame longitudinal guides in a selected longitudinal position on said vertical guiding means,
   said locking means comprising a catch pivotally mounted directly on said pivot pin, said catch comprising means to directly engage said top frame longitudinal guide which directly supports said seat.

2. A device as claimed in claim 1, wherein said catch of said locking means has a recess, said locking means further comprising a toothed rack cut in said top frame longitudinal guide, any of the teeth of said toothed rack being selectively engageable by said catch recess corresponding to the longitudinal position of said top frame relative to said vertical guiding means, and spring means to urge said catch toward said toothed rack.

3. A device according to claim 1, further comprising two said locking means and release means for controlling the release of the catches cooperating with each of the two guides of the top frame, said release means comprising a longitudinal rod having two ends bent-back at right angles and mounted on said top frame for pivotal displacement about a longitudinal pin, said longitudinal rod being adapted to rest on a cross-member for connecting the ends of the catches which are adapted to cooperate respectively with the two guides of the top frame, said longitudinal rod being fitted with an operating handle.

4. A device according to claims 1, 2 or 3, wherein at least one of the guides of the top frame comprise two stops to limit the range of sliding motion of the bearing within said guide.

* * * * *